May 4, 1943. E. R. DERBY ET AL 2,318,469
METHOD AND APPARATUS FOR PRODUCING SHEET MATERIAL
Filed Feb. 16, 1939
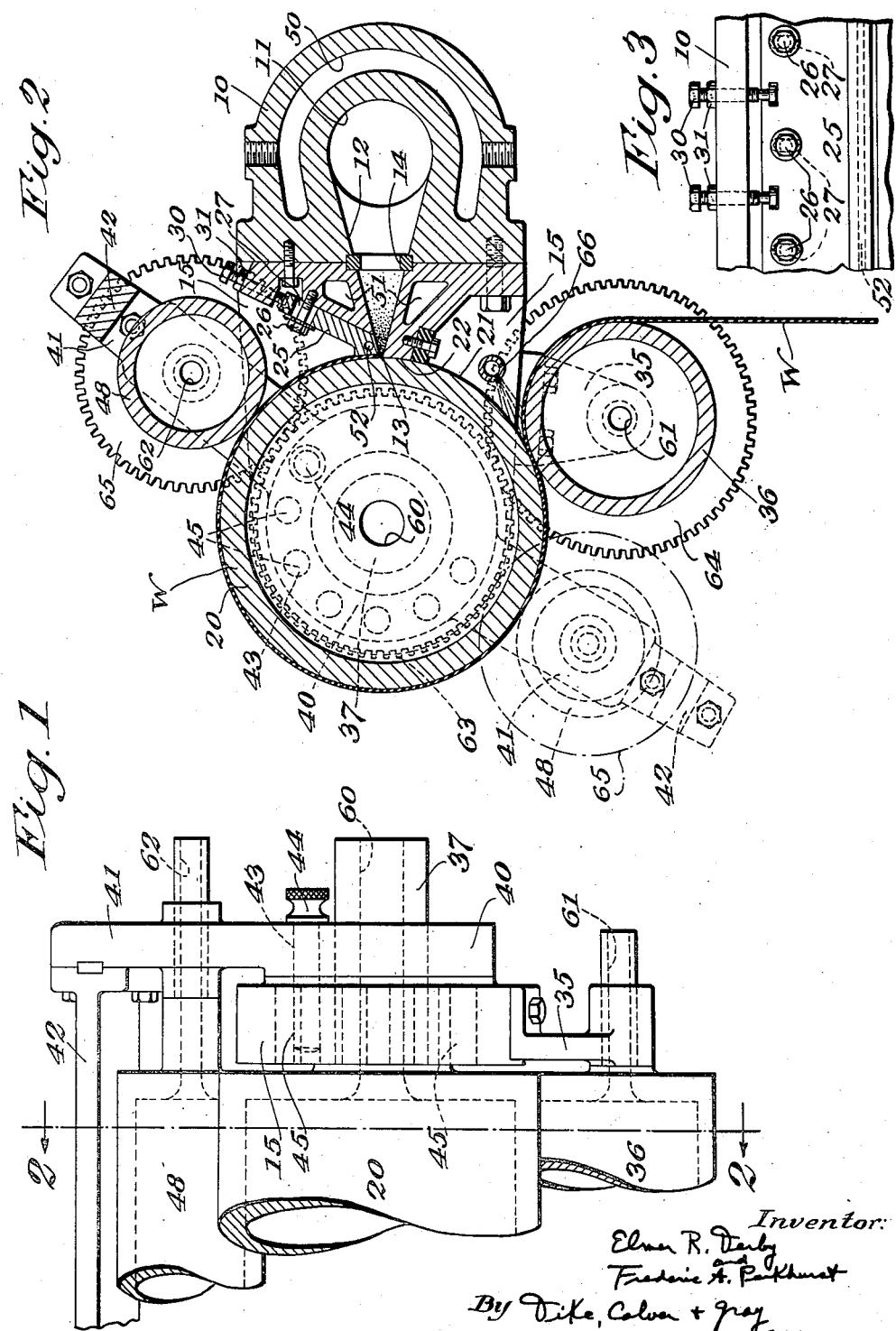
Inventor:
Elmer R. Derby
Frederic A. Parkhurst
By Dike, Calver + Gray
Attorneys Patented May 4, 1943

2,318,469

UNITED STATES PATENT OFFICE 2,318,469

METHOD AND APPARATUS FOR PRODUCING SHEET MATERIAL

Elmer R. Derby, Springfield, Mass., and Frederic A. Parkhurst, Suffield, Conn., assignors to Monsanto Chemical Company, St. Louis, Mo., a corporation of Delaware Continuation of application Serial No. 142,352, May 13, 1937. This application February 16, 1939, Serial No. 256,696

10 Claims. (Cl. 18—15)

The present application is a continuation of our application for Apparatus for producing sheet material, filed May 13, 1937, Serial No. 142,352. The present invention relates to a method and apparatus for forming a continuous web, sheet or ribbon from plastic material, such webs being of different thicknesses according to the use to which they are to be put, for instance, interlayers for laminated glass and wrappings for articles and packages. The process embodying our invention is applicable to the manufacture of webs or ribbons from cellulose esters, such as cellulose nitrate or acetate; cellulose ethers, such as ethyl cellulose; and plasticized polyvinyl acetal resins made with various aldehydes, such as butyraldehyde and formaldehyde. Our novel process and machine are also particularly applicable to the manufacture of thin transparent material of completely colloided thermoplastic materials in accordance with the process described in the application of Gustavus J. Esselen and Elmer R. Derby filed February 16, 1939, Serial No. 256,732. It is desirable in the manufacture of these materials into sheets for certain purposes that the gauge be extremely uniform and in the case of sandwich material for laminated glass, the variations in gauge must not exceed 0.001 inch in one inch of length or breadth. In the manufacture of plasticized cellulose nitrate sheet-stock to be used as sandwich material for laminated glass it has been found practical to form a continuous web by extruding the stock by means of a rotary die, for instance, such as is shown in the patent to Parkhurst No. 1,881,917, dated October 11, 1932, and in connection with the manufacture of plasticized cellulose acetate a straight slot die, such as is shown in the patent to Parkhurst No. 2,061,042, dated November 17, 1936, may be used. However, it has not been found practical to use the procedure described in these patents for the manufacture of plasticized polyvinyl acetal resin, nor in the manufacture of thin transparent continuous web of any of these materials. The plasticized polyvinyl acetal resins are relatively soft, but are extremely tough and rubbery. They resist permanent deformation and tend to return to their original form and shape for a long time after having been deformed. They are tacky on the surface and adhere to metallic surfaces. These properties appear to have a definite effect on gauge. None of the procedures mentioned have been found satisfactory in the manufacture of thin transparent webs, sheets or ribbons having a thickness of less than 0.005 of an inch.

However, we have discovered that it is possible to produce material of a satisfactory gauge from the substances mentioned and in gauges varying from below 0.005 of an inch to upwards of 0.050 of an inch and to do so at rates of from 10 to 60 linear feet per minute. All of the materials in question are thermoplastic and our novel method takes advantage of their thermoplastic properties. We have found that if a suitable mix is made, which in some cases is made with small amounts of volatile solvent and is heated to increase its plasticity, and this mix is then extruded into contact with a smooth travelling surface such as a roller or polished endless belt of a temperature enough lower than that of the mix to set the portion of the mass as it contacts with the travelling surface, and that practically simultaneously the mass, while still on the travelling surface, is passed under a heated member conveniently called a die blade the temperature of which is high enough to maintain or possibly increase the plasticity of the mix, a sheet of extremely uniform gauge and, in the case of certain materials, having highly polished surfaces on both sides may be produced. We are not entirely certain as to the exact action of the heated die blade which forms the surface opposite to that formed first by the travelling surface, but it is possible that at the instant the sheet passes out from under the heated die blade, its surface is sufficiently fluid so that the surface tension of the material has some effect in reducing inequalities and enhancing the polish of the surface. Our present method is particularly effective in producing sheets from completely colloided materials. Since the particular features of the method of forming such high polished transparent sheets from completely colloided materials of this kind are separate inventions, no claims thereto are included herein.

One apparatus embodying our invention and preferably used for the practice of our novel method is shown in the accompanying drawing:

Fig. 1 is a front elevational view of an apparatus embodying the invention, partly broken away, Fig. 2 is a sectional elevational view taken on the line 2—2 of Fig. 1; and Fig. 3 shows diagrammatically means for supporting the die blade.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The apparatus illustrated in the accompanying drawing comprises a hollow casing 10 having a cylindrical chamber 11 to which plastic material is supplied through one end thereof. This casing is of novel construction and is the subject of a separate application for Letters Patent. The casing 10 also is provided with a passage 12 extending laterally from the passage 11. The walls of the passage 12 taper toward one another and terminate adjacent the surface of a roll 20. If desired, a bridge or screen 14 may be interposed in the passage 12.

At each of its ends the casing 10 is provided with a forwardly extending projection 15 in which are formed suitable bearings for rotatably supporting the die roll 20 so that its periphery 21 closely engages the surface of the casing on one side of the passage 12 and prevents any flow of stock along the surface of the roll in this direction. A plate 25, conveniently known as the die blade, forms the end of the opposite wall of the passage in the casing, and with the roll 20 forms the orifice through which the stock is forced to produce the sheet or web. Preferably, the end of the plate 25 which forms one wall of the orifice is parallel to a tangent to the roll 20. This plate 25 is secured upon the casing 10 by bolts 26 extending through slots 27 in the plate 25 and engaging the casing 10. The position of the plate 25 may be adjusted toward and from the roll 20 and toward and from the wall 22 by screws 30 threaded in the casing 10 and engaging the top edge of the plate 25. The screws 30 may be locked in desired position by lock nuts 31. The space between the die blade 25 and the roll 20 forms the extrustion slot which is a primary factor in determining the thickness of the web produced and the character of its surface.

A take-off roll 36, the periphery of which is spaced from the periphery of the roll 20 a distance corresponding to the thickness or gauge of the sheet or web being produced, is rotatably supported in bearings in brackets 35 secured to extensions 15.

The casing 10 is provided with heating means here shown as a water jacket 50 embracing the chamber 11. The casing may also be provided with water jackets 51 extending above and below the passage 12. A water jacket 52 is provided in the plate 25 near the roll 20. The main roll 20 as well as the take-off roll 36 are hollow and may be supplied with water for controlling their temperature through axial passages 60 and 61 respectively. Preferably, the rolls 20 and 36 are positively rotated and for this purpose may be connected through gears 63 and 64 supplied with power from any suitable source. In order to assist the removal of the web W of sheet material from the main roll 20, a compressed air nozzle 66 is provided adapted to force air under pressure between the web W and the periphery 21 of the roll.

Assuming that the plate 25 has been adjusted to the desired position with respect to the roll 20, plastic material is supplied under pressure to the chamber 11 through one end thereof and thence is forced through the passage 12 and is extruded through the orifice 13 directly upon the periphery of the roll 20 in the form of a thin web W. The web W is moved away from the orifice by the rotation of the roll 20 and later is removed from the roll 20 by the take-off roll 36 and is led to another point for further treatment or storage.

Roller 48, having axle 62, is rotatably supported by frame 41, which, with strengthening crosspiece 42, is rotatable about the axis of main roll 20 to adjustable positions about the exterior thereof, as illustrated in full lines and dotted lines in Fig. 2. Roller 48 is rotated by gear wheel 65 in contact with gear wheel 63 of main roll 20.

For purposes of illustration the following examples of mixes of base materials, together with the temperatures to be employed at the several points of the machine are given as follows:

*Example 1.*—A polyvinyl acetal resin is made by combining a partially hydrolyzed polyvinyl acetate with butyraldehyde under such conditions as to give a product containing approximately 18–20% uncombined polyvinyl alcohol, 1–2% polyvinyl acetate and the balance substantially acetal. This is mixed with 43 parts of triethylene glycol dihexoate to each 100 parts of the vinyl acetal resin. No volatile solvent is used.

The resin and plasticizer are mixed together in any convenient type of mixer as, for example, a jacketed kneading machine and the mass is agitated until it takes on a sponge-like consistency. If this mixing operation is carried on at a temperature of approximately 120° F. the operation takes about one hour for a batch of 200 to 300 lbs. of resin. The resin is put in the machine first and the plasticizer is then poured in, being distributed as well as possible. Where two or more plasticizers are used they are mixed in the required proportions before being added to the resin.

After the mixture has assumed the uniform sponge-like consistency it is transferred to a Banbury mixer which is at a temperature of approximately 180° F. Within two or three minutes the batch begins to decrease in volume, loses its spongy quality and begins to weld into a tough, translucent mass. Cold water is then circulated through the jacket of the Banbury mixer and mixing is continued for from twelve to fifteen minutes longer after which the entire mass will have become tough and rubbery. Even though cold water has been circulated through the jacket of the mixer the internal heat raises the temperature of the mix to approximately 280° F. at this point. The material is now ready to be filtered or strained.

The tough, rubbery mixture, prepared as described above, is fed in chunks of about 15 lbs. each into the cylinder of a hydraulic strainer. With each addition the mass is packed tightly by a packing ram. The mass as it comes from the mixer is usually opaque due to the presence of air bubbles but during the packing of the straining cylinder the greater part of the entrapped air is forced out and the opacity decreases.

The mix is forced through a fine chrome steel screen backed by a Monel metal screen. Particles of dirt and foreign matter are removed by these filter media. The strainer plate which supports the filter media is heated to between 240° to 310° F., the lower temperature range being preferred. The cylinders of the hydraulic strainers are heated to between 160 and 220° F., about 180° F. being preferred.

From the outlet of the hydraulic strainer the filtered stock heated as described is fed under pressure to the chamber 11 of the machine shown in the drawing. In this machine the temperature of the body of the machine, housed by casing 10 is maintained between 280° and 320° F., preferably about 300° F., and the die blade 25 is maintained between 230° F. and 280° F., about 240° F. being preferred; the die roll 20 is maintained at about 120° to 150° F., about 130° F. being preferred, the take-off 36 is maintained between 160° and 200° F., about 180° being preferred. Since the temperature of the die roll 20 is lower than that of the die blade 25 and the casing 10, the stock when it first contacts with the surface of the die roll as it emerges from the orifice 13 in the casing is chilled and begins to harden while the portion of the stock which is in contact with the die blade 25 is maintained in a relatively hot and, therefore, more plastic condition. The temperature of the stock at the moment of sheet formation, i. e. when it passes under the die blade, is difficult to ascertain because as stated, it is not uniform throughout the thickness of the sheet. Before contacting with the die roll 20, the temperature of the stock is between 160° and 220° F., preferably about 200° F. For some formulations where the quantity of plasticizer is increased and the plastic is consequently more heat sensitive, a downward revision of 10° to 20° F. in temperature is allowed. Although the die roll 20 is maintained at a temperature above that of the atmosphere, it has, as already pointed out, the advantage of chilling the stock since the temperature is much below that of the stock itself. The pressure in the chamber behind the die orifice is maintained at from 350 to 400 pounds per square inch. These operating conditions apply to a particular extrusion unit operating on the mix described at a ribbon speed of 10 to 35 feet per minute and producing stock of 0.015 inch thickness.

*Example 2.*—The mix is made as follows:

| | Parts |
|---|---|
| Cellulose acetate (37.5 to 38.5 per cent acetyl) | 100 |
| Di (methoxy ethyl) phthalate | 15 |
| Diethyl phthalate | 15 |
| Acetone | 15 |
| Denatured alcohol containing 5 to 6% of water by volume | 24 |
| Ethyl acetate | 24 |

In preparing this mix the cellulose acetate is charged into a jacketed kneading machine heated to 118° F. The solvents and plasticizers are weighed and mixed and added to the cellulose acetate in the mixer while stirring. After about 40 minutes, the direction of rtoation of the mixing paddles is reversed for about five minutes to insure that no pockets of incompletely mixed materials have been found, after which the mixing paddles are again reversed to normal mixing direction and mixing continued for another 20 minutes. The temperature of the batch reaches 160° F. after about 40 minutes mixing and is kept at this point throughout the remainder of the mixing cycle by supplying hot or cold water to the mixer jacket as required.

The mixture thus prepared is completely colloided and is formed into a sheet by the machine shown in the drawing. In this case the temperature of the casing 10 is maintained between 150° F. and 200° F., preferably about 175° F., the die blade 25 is maintained between 120° F. and 180° F., about 135° F. being preferred; the die roll 20 is maintained at 80° F. to 140° F., about 120° F. being preferred, and the take-off roll is maintained between 40° F. and 120° F., about 65° F. being preferred. The temperature of the stock before contacting with the die roll 20 is at a temperature between 120° F. and 200° F. preferably about 160° F. The pressure in the casing behind the die orifice 13 is maintained between 350 and 600 pounds per square inch. These operating conditions apply to a particular extrusion unit operating on the mix described and producing a transparent ribbon at a ribbon speed of from 10 to 60 feet per minute, the stock being .005 inch in thickness.

It should be recognized that there is an interdependence between temperatures, pressures and speeds and that they are a function of the size of the unit as well as the properties of the plastic.

While it has been impossible to ascertain exactly what takes place at the time of sheet formation, it seems probable that the chilling effect of the die roll 20 tends to stiffen or set one face of the web as it is being formed, while the other face is still maintained in a soft plastic condition and is being formed by the die blade 25 and that as the softer surface emerges from under the die blade it tends to flatten out and to assume a highly polished surface. At any rate, with completely colloided stock, such as is described in Example 2, it is possible to produce webs or ribbons both surfaces of which have a high gloss or polish.

What is claimed is:

1. The method of making continuous sheets of thermoplastic material which comprises heating the thermoplastic material sufficiently to increase its plasticity and thereby render it more readily formable, forcing the material continuously through an orifice formed between a continuously moving continuous surface and a fixed member extending in contact with said material only slightly beyond the point of initial contact of the material with the moving surface, said moving surface extending beyond said fixed member and being sufficiently cooler than the material to harden the surface of the material as it contacts therewith, and said fixed member being maintained at a temperature higher than that at which the material solidifies too much to be formed, so that the fixed member gives form to the softened face of the web being formed after the opposite surface has been formed by contact with said moving surface, and continuing contact of the formed continuous web with the said moving surface after said web has moved beyond said fixed member.

2. The method of making a continuous web of thermoplastic material which comprises heating the material sufficiently to increase its plasticity and thereby render it more readily formable, extruding the softened material between a heated member and a cooled continuously moving continuous surface extending beyond said heated member and forming therewith an orifice, said heated member extending in contact with said material only slightly beyond the point of initial contact of the softened material with the cooled moving surface so that one surface of the web being formed is chilled and supported by said moving surface as the web passes said heated member which gives form to the other surface of the web, and continuing contact of the formed web with said moving surface after said web has moved beyond said heated member.

3. The method of making a continuous web of thermoplastic material which comprises heating the thermoplastic material sufficiently to increase its plasticity and thereby render it more readily formable, forcing the softened material first against a continuously moving continuous surface and then forcing it past a stationary blade while supported by said moving surface, which forms an orifice with said blade, said stationary blade extending in contact with said material only slightly beyond the point of initial contact of the softened material with the moving surface, said moving surface extending beyond said stationary blade, maintaining said moving surface at a temperature less than that of said material so as to chill and set one face of the web, and maintaining said stationary blade at a temperature above that at which said material solidifies too much to be formed, and continuing contact of the formed web with said moving surface after said web has moved beyond said stationary blade.

4. The method of making a continuous web of thermoplastic material which comprises heating the material sufficiently to increase its plasticity and thereby render it more readily formable, forming the web by forcing the softened material between two members, one of which is continuous and continuously moving and which forms an orifice with the other member, the other member extending in contact with said material only slightly beyond the point of initial contact of the softened material with the moving member, said moving member extending beyond the other member, cooling the moving member, and maintaining the other member at a temperature higher than that at which the material solidifies too much to be formed, and continuing contact of the formed web with said moving member after said web has moved beyond the other member.

5. The method of making a continuous web of thermoplastic material which comprises heating the material sufficiently to increase its plasticity and thereby render it more readily formable, forming the web by forcing the softened material between two members, one of which is continuous and continuously moving and which forms an orifice with the other member, the other member extending in contact with said material only slightly beyond the point of initial contact of the softened material with the moving member, said moving member extending beyond the other member, cooling the moving member to harden one surface of the web while the other surface in contact with said other member is maintained softened and engaging the other member, heating said other member while it is giving form to the web, and continuing contact of the formed web with said moving member after said web has moved beyond said other member.

6. The method of making a continuous web of thermoplastic material which comprises heating the thermoplastic material sufficiently to increase its plasticity and thereby render it more readily formable, forming the web by forcing the plastic material between two members, one of which is continuous and continuously moving and which forms an orifice with the other member, said other member extending in contact with the web only slightly beyond the point of initial contact of the plastic material with said moving member, said moving member extending beyond said other member, cooling the moving member to harden one surface of the web while the other surface in contact with said other member is maintained softened, and, while giving form to the web, maintaining said other member at a temperature higher than that at which the material solidifies too much to be formed, and continuing contact of the formed web with said moving member after said web has moved beyond said other member.

7. An apparatus for making continuous webs of thermoplastic material which comprises in combination pressure feed means provided with heating means, a continuous moving surface adjacent said feed means, a stationary member located adjacent said pressure feed means and said continuous moving surface and forming in combination an extrusion apparatus having an orifice extending only slightly beyond the initial point of contact with said moving surface of the thermoplastic material being extruded, said moving surface extending beyond said stationary member, means for cooling the moving surface adjacent said stationary member, means for heating the stationary member, and means spaced apart from said stationary member for maintaining the formed web in intimate contact with the continuous moving surface after extrusion through said orifice.

8. An apparatus for making continuous webs of thermoplastic material which comprises in combination pressure feed means provided with heating means, a continuous moving surface adjacent said feed means and a stationary blade located adjacent said feed means and said continuous moving surface and forming in combination an extrusion apparatus having an orifice extending only slightly beyond the point of initial contact of the thermoplastic material with said moving surface, said moving surface extending beyond said stationary blade, means for cooling the moving surface adjacent said blade sufficiently to harden the thermoplastic material as it contacts with the surface thereof, means for heating the stationary blade, and means spaced apart from said blade for maintaining the formed web in intimate contact with said continuous moving surface after extrusion through said orifice.

9. An apparatus for making continuous webs of thermoplastic material which comprises in combination pressure feed means provided with heating means, a continuous rotating surface adjacent said feed means and a fixed member located adjacent said pressure feed means and said continuous rotating surface and forming in combination an extrusion apparatus having an orifice extending only slightly beyond the point of initial contact of the thermoplastic material with said rotating surface, said rotating surface extending beyond said fixed member, means for cooling the continuous rotating surface adjacent said fixed member sufficiently to harden the thermoplastic material as it contacts with the surface thereof, means for heating the fixed member, and means spaced apart from said fixed member for maintaining the formed web in intimate contact with said continuous rotating surface after extrusion through said orifice.

10. An apparatus for making continuous webs of thermoplastic material which comprises in combination pressure feed means having a heating means, a continuously movable continuous surface adjacent said feed means, a member located adjacent said feed means and said surface and forming in combination an extrusion apparatus having an orifice extending only a short distance coextensively with said surface along the path of movement thereof, said movable surface extending beyond said member, means for cooling said movable surface, means for controlling the temperature of said member, and means spaced apart from said member for maintaining the formed web in contact with said movable surface after extrusion through said orifice.

ELMER R. DERBY.
FREDERIC A. PARKHURST.